US012151749B2

(12) United States Patent
Lee (10) Patent No.: US 12,151,749 B2
(45) Date of Patent: Nov. 26, 2024

(54) STEERING SYSTEM FOR STEER-BY-WIRE

(71) Applicant: HL MANDO CORPORATION, Gyeonggi-do (KR)

(72) Inventor: Suk Hee Lee, Seoul (KR)

(73) Assignee: HL MANDO CORPORATION, Gyeonggi-Do (KR)

( * ) Notice: Subject to any disclaimer, the term of this patent is extended or adjusted under 35 U.S.C. 154(b) by 586 days.

(21) Appl. No.: 17/438,933

(22) PCT Filed: Feb. 17, 2020

(86) PCT No.: PCT/KR2020/002229
§ 371 (c)(1),
(2) Date: Sep. 13, 2021

(87) PCT Pub. No.: WO2020/184858
PCT Pub. Date: Sep. 17, 2020

(65) Prior Publication Data
US 2022/0153337 A1    May 19, 2022

(30) Foreign Application Priority Data

Mar. 14, 2019   (KR) ........................ 10-2019-0029548

(51) Int. Cl.
*B62D 5/00*    (2006.01)
*B62D 5/04*    (2006.01)

(52) U.S. Cl.
CPC ........... *B62D 5/006* (2013.01); *B62D 5/0409* (2013.01); *B62D 5/046* (2013.01)

(58) Field of Classification Search
CPC ....... B62D 5/006; B62D 5/0409; B62D 5/046
See application file for complete search history.

(56) References Cited

U.S. PATENT DOCUMENTS

| 4,009,641 A | 3/1977 | Rohde et al. |
| 5,123,505 A | 6/1992 | Antony |
| 6,481,526 B1 | 11/2002 | Millsap et al. |
| 2005/0145433 A1 | 7/2005 | Akuta et al. |
| 2018/0362079 A1* | 12/2018 | Zuzelski ................. B62D 5/04 |

FOREIGN PATENT DOCUMENTS

| CN | 101524991 | 9/2009 |
| CN | 102242785 | 11/2011 |
| CN | 102734354 | 10/2012 |

(Continued)

OTHER PUBLICATIONS

International Search Report for PCT/KR2020/002229 mailed on May 29, 2020 (now published as WO 2020/184858) with English translation provided by the WIPO.

(Continued)

*Primary Examiner* — Jacob D Knutson
(74) *Attorney, Agent, or Firm* — Womble Bond Dickinson (US) LLP (57) ABSTRACT

According to the present embodiments, torque caused by friction when a steering shaft rotates is applied so as to provide weight to the operation of a steering wheel by a driver, and the steering shaft is restricted from rotating in certain situations in which wheels can no longer rotate, such as when the wheels are caught on a curb, thereby enabling the steerability and steering stability of the driver to be improved.

16 Claims, 6 Drawing Sheets

(56) References Cited

FOREIGN PATENT DOCUMENTS

| | | | |
|---|---|---|---|
| CN | 105438251 | 3/2016 | |
| CN | 206653859 U | 11/2017 | |
| CN | 108025382 | 5/2018 | |
| CN | 114104086 A * | 3/2022 | ............ B62D 5/001 |
| DE | 102019202294 A1 * | 8/2020 | |
| ES | 2 188 789 | 7/2003 | |
| JP | 9-102329 | 4/1997 | |
| JP | 2000-211538 | 8/2000 | |
| JP | 2012-035738 | 2/2012 | |
| JP | 2012035738 A * | 2/2012 | ............ B62D 5/006 |
| JP | 2014-69739 | 4/2014 | |
| JP | 2016-60393 | 4/2016 | |
| KR | 10-2010-0047522 | 5/2010 | |
| KR | 10-2014-0042746 | 4/2014 | |
| WO | WO-2007049444 A1 * | 5/2007 | ........... B62D 5/0409 |
| WO | WO-2020055068 A1 * | 3/2020 | ............... F16H 1/28 |

OTHER PUBLICATIONS

Written Opinion of the International Searching Authority for PCT/KR2020/002229 mailed on May 29, 2020 (now published as WO 2020/184858) with English translation provided by Google Translate.

Office Action dated Nov. 23, 2023 for Chinese Patent Application No. 202080021287.X and its English translation by Google Translate.

International Preliminary Report on Patentability (Chapter I) for PCT/KR2020/002229 mailed on Aug. 25, 2021 and its English translation from WIPO (now published as WO 2020/184858).

Notice of Allowance dated Apr. 15, 2024 for Chinese Patent Application No. 202080021287.X and its English translation provided by the Applicant's foreign counsel.

Li Wubo: "Research on Test and Control of Electric Power Steering System", South China University of Technology, Guangzhou, China, Dec. 15, 2011, English Abstract, pp. 1-92.

\* cited by examiner

STEERING SYSTEM FOR STEER-BY-WIRE

TECHNICAL FIELD

The present embodiments relate to a steering device for steer-by-wire, and more specifically, to a steering device for steer-by-wire, which may provide the sensation of weight to the driver's manipulation of the steering wheel by applying friction torque when the steering shaft rotates and may restrict rotation of the steering shaft in a situation where a wheel is no more rotated, e.g., by being stuck to a curb to thereby enhance the driver's steering feel and stability.

BACKGROUND ART

A steer-by-wire steering device is a kind of electromotive steering device that steers the vehicle using electric power without any mechanical connection, such as a steering column or universal joint, between the steering wheel and the front wheel steering device.

In other words, the driver's manipulation of the steering wheel is converted into an electric signal, and the electronic control device receives the electric signal and accordingly determines the output of the motor. Due to a lack of mechanical connection, the steer-by-wire system reduces injury to the driver by a mechanical part when a car crash occurs. Further, by saving parts, e.g., hydraulic parts and mechanical connections, the steer-by-wire system may lead to lightweight vehicles and a significant reduction in assembly line man-hour, thereby saving unnecessary energy consumption during steering and hence enhancing fuel efficiency. Further, it is possible to achieve ideal steering performance by ECU programming.

Due to lack of mechanical linkage between the steering shaft and the wheels, conventional steer-by-wire steering devices are unable to convey the sensation of weight, coming from wheel friction against the road or being stuck, to the driver, causing poor steering feel and the steering wheel to be still turnable despite inability for a wheel to rotate further due to being stuck to, e.g., a curb.

DETAILED DESCRIPTION OF THE INVENTION

Technical Problem

The present embodiments have been conceived in the foregoing background, aiming to provide the sensation of weight to the driver's manipulation of the steering wheel by applying friction torque when the steering shaft rotates and may restrict rotation of the steering shaft in a situation where a wheel is no more rotated, e.g., by being stuck to a curb to thereby enhance the driver's steering feel and stability.

The objects of the present embodiments are not limited to the foregoing and other objects will be apparent to one of ordinary skill in the art from the following detailed description.

Technical Solution

According to the present embodiments, there may be provided a steering device for steer-by-wire, comprising a first gear engaged with a gear part provided on an outer circumferential surface of a steering shaft, a second gear having an inner circumferential surface engaged with the first gear, a disk provided coaxially with the steering shaft and rotated in conjunction with the first gear, and a rotation limiter including a fixed frame provided with a pair of supporting parts spaced apart from each other in a width direction thereof, a driving frame facing a first side of the disk and provided to be axially slidable between the supporting parts, and an actuator sliding the driving frame.

Advantageous Effects

According to the present embodiments, it is possible to provide the sensation of weight to the driver's manipulation of the steering wheel by applying friction torque when the steering shaft rotates and may restrict rotation of the steering shaft in a situation where a wheel is no more rotated, e.g., by being stuck to a curb to thereby enhance the driver's steering feel and stability.

MODE FOR CARRYING OUT THE INVENTION

In the following description of examples or embodiments of the present disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the present disclosure, detailed descriptions of well-known functions and components incorporated herein will be omitted when it is determined that the description may make the subject matter in some embodiments of the present disclosure rather unclear.

Terms, such as "first", "second", "A", "B", "(A)", or "(B)" may be used herein to describe elements of the disclosure. Each of these terms is not used to define essence, order, sequence, or number of elements etc., but is used merely to distinguish the corresponding element from other elements. When it is mentioned that a first element "is connected or coupled to", "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element.

Figure 1:
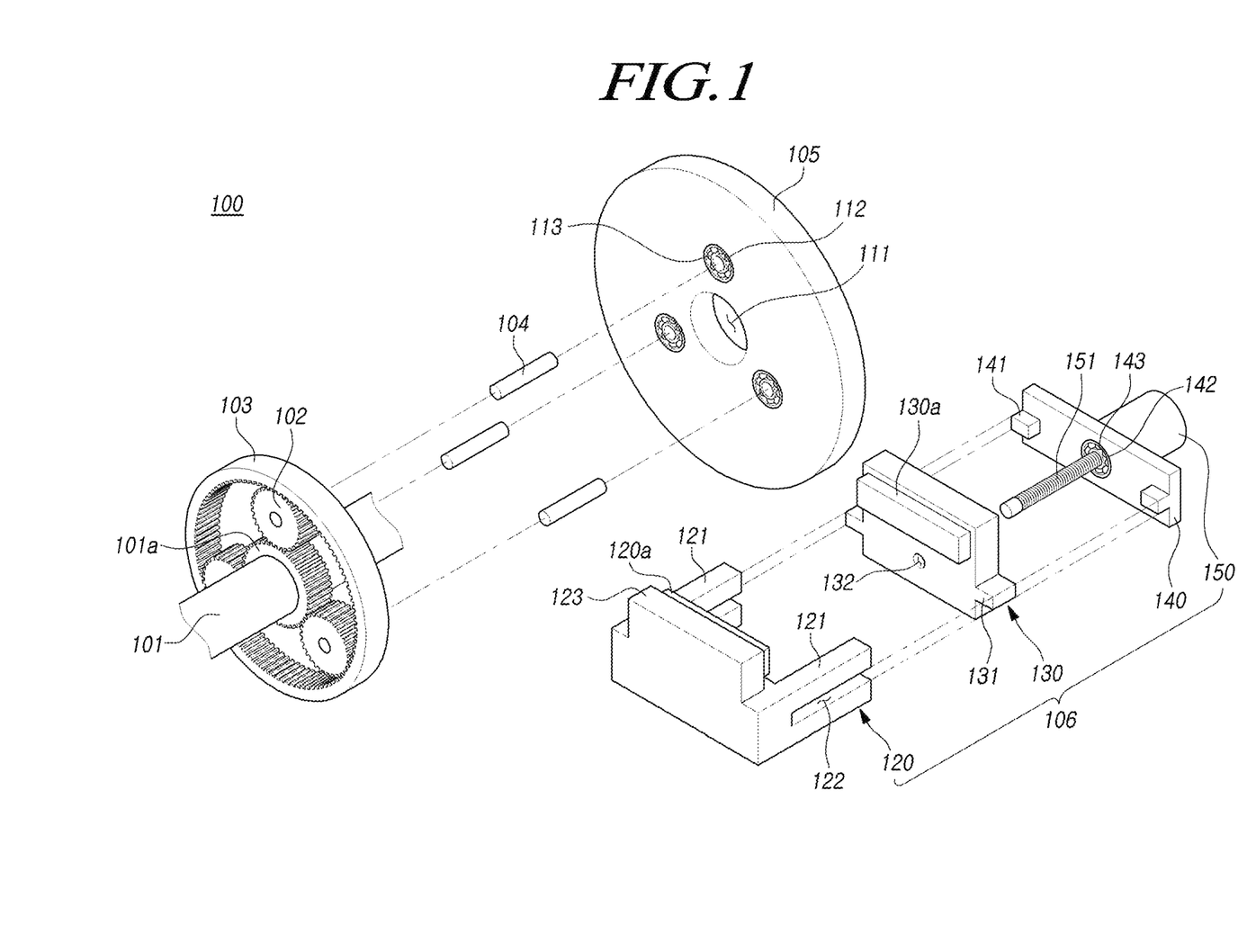
FIG. 1 is an exploded perspective view illustrating a steering device for steer-by-wire according to the present embodiments.
Figure 2:
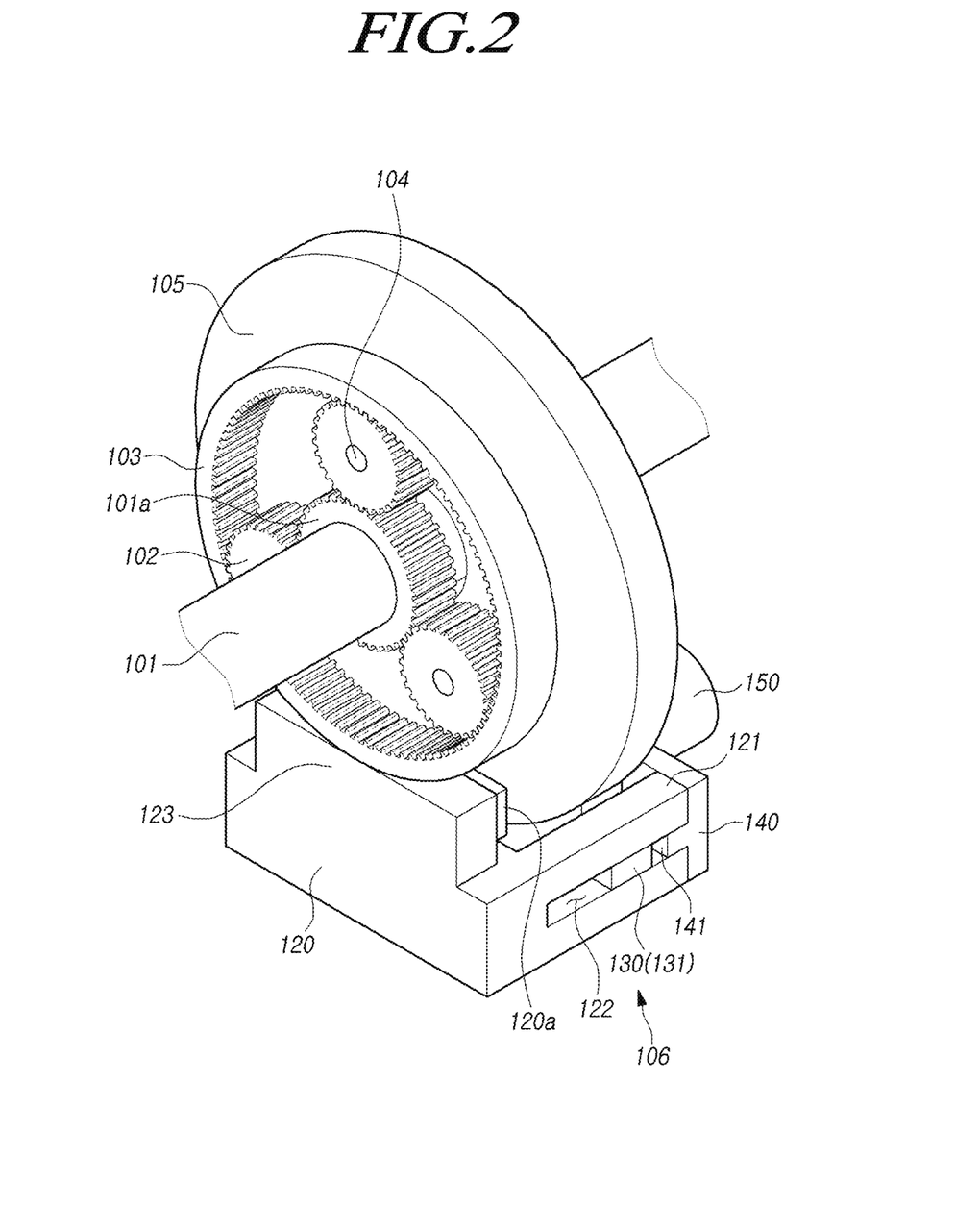
FIG. 2 is a perspective view illustrating an assembled state of FIG. 1.
Figure 3:
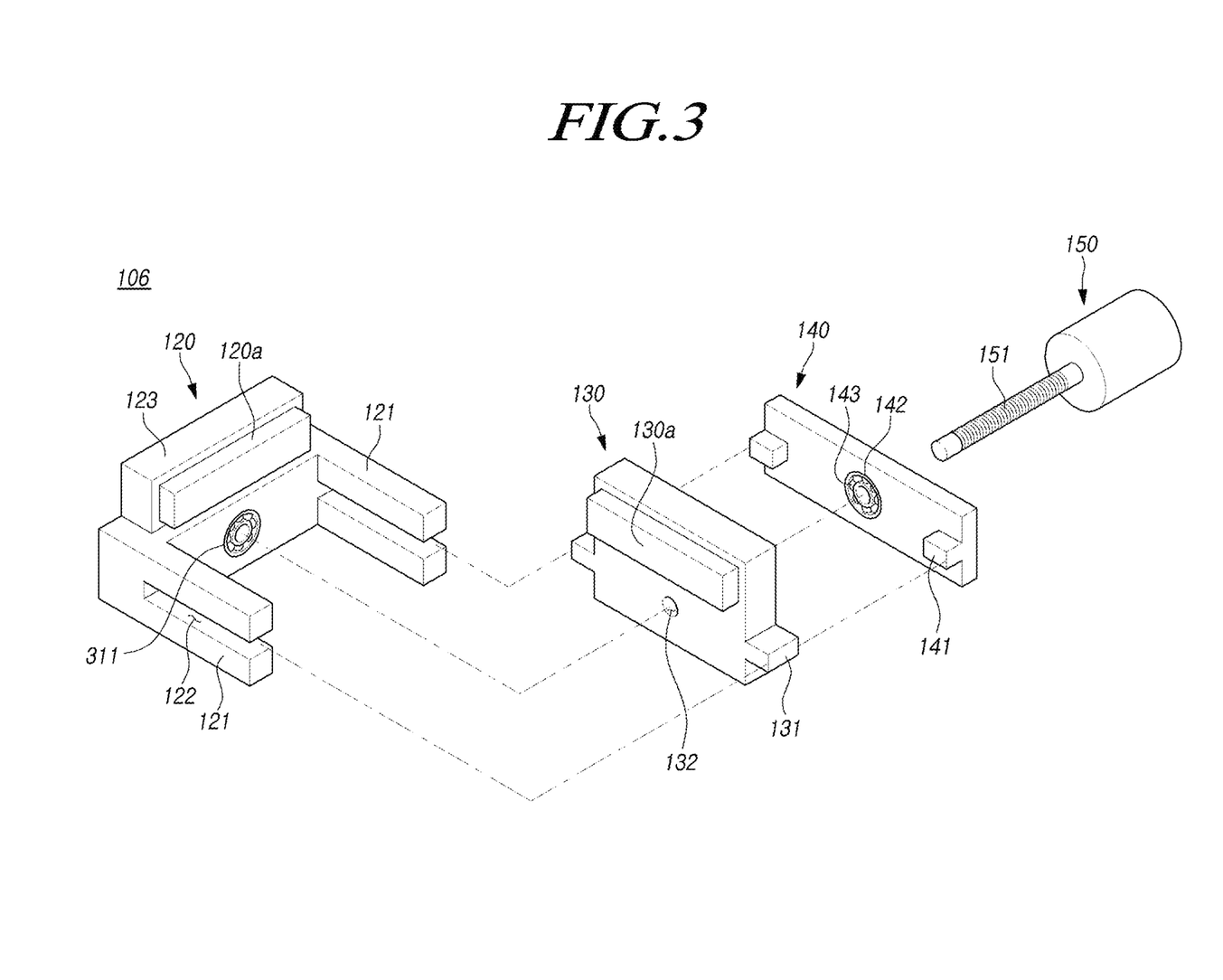
FIG. 3 is a perspective view illustrating a portion of FIG. 1.
Figure 4:
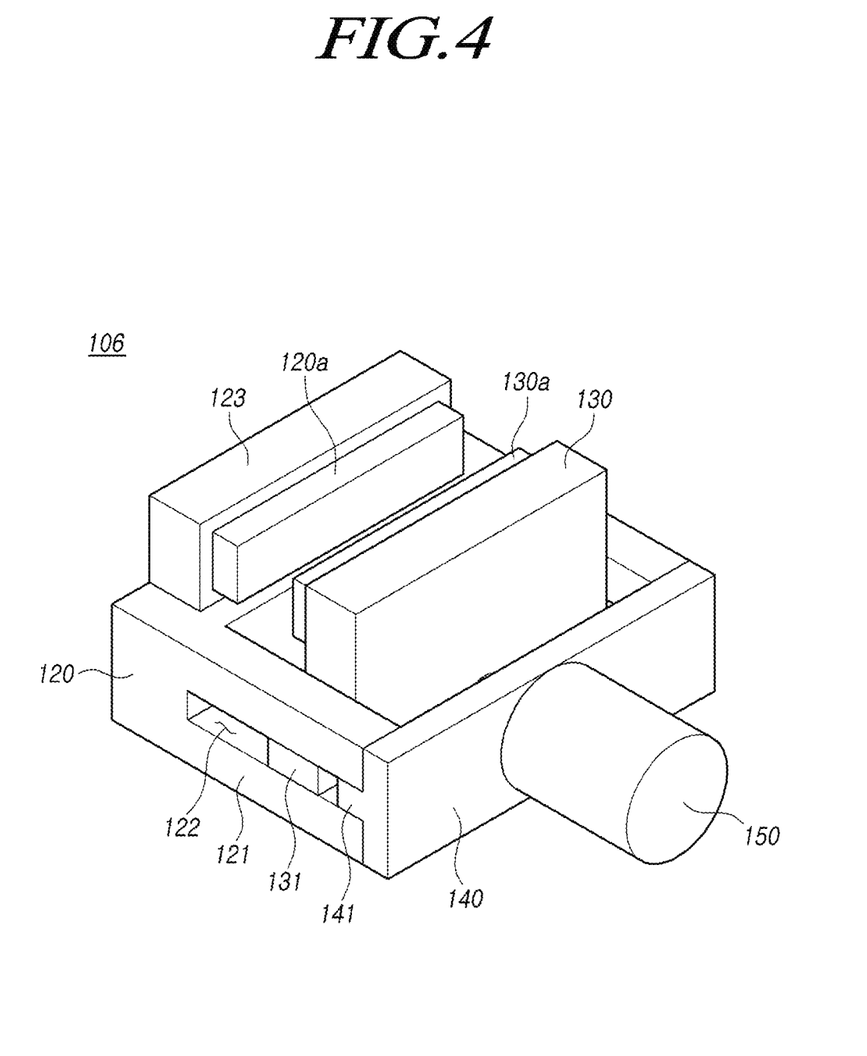
FIG. 4 is a perspective view illustrating an assembled state of FIG. 3.
Figure 5:
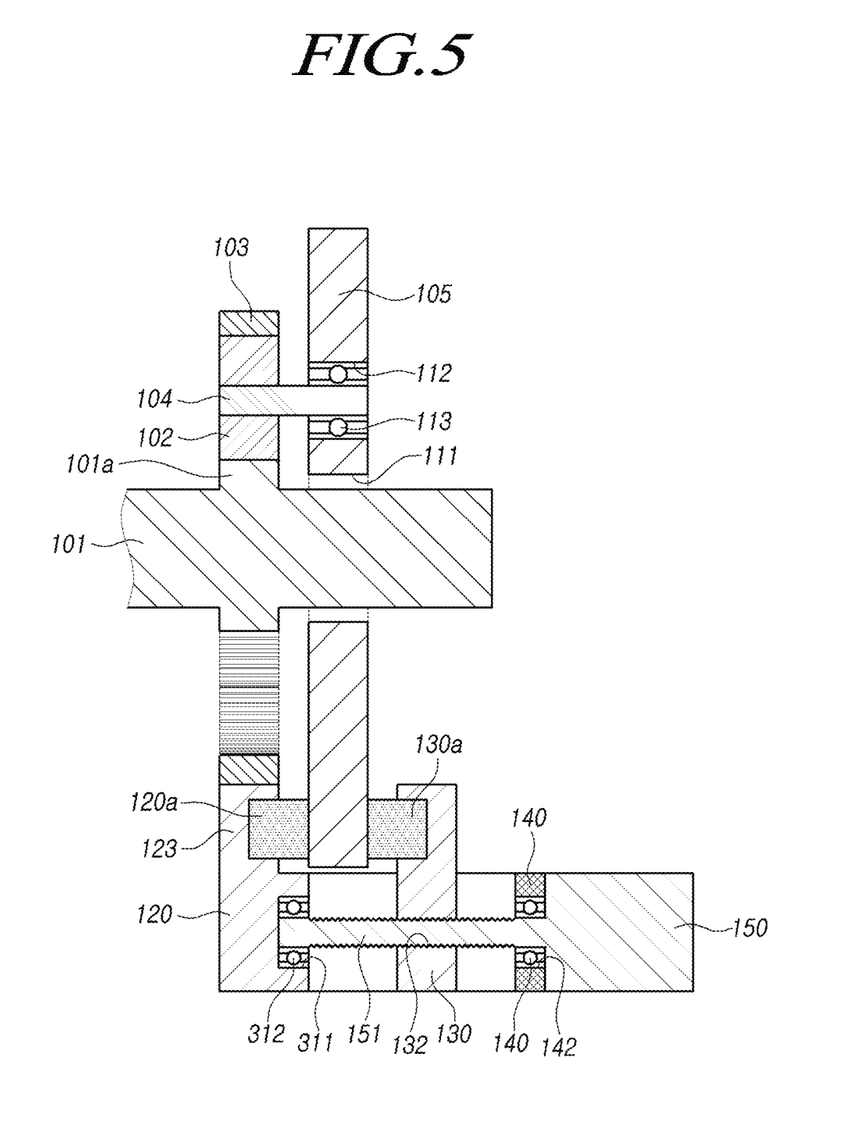
FIGS. 5 and 6 are cross-sectional views of FIG. 2.
Figure 6:
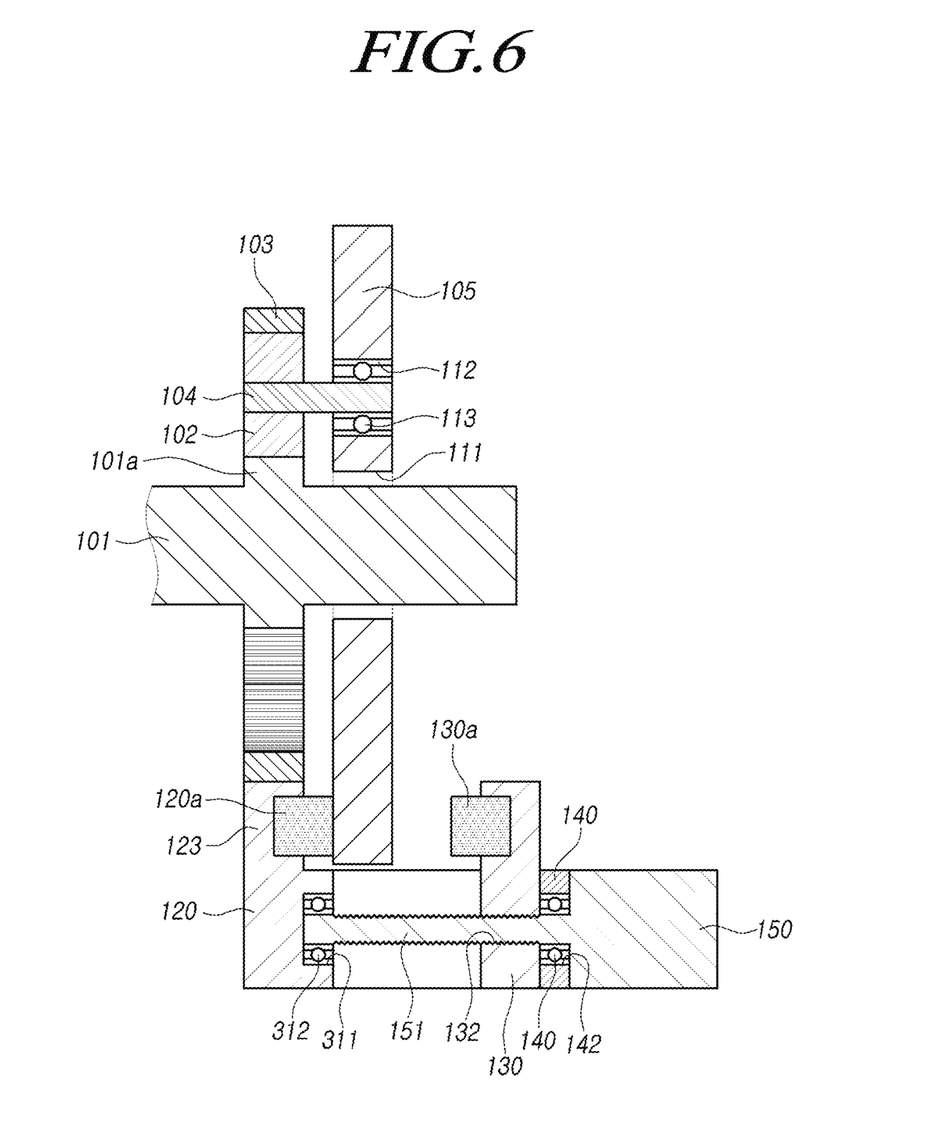

FIG. 1 is an exploded perspective view illustrating a steering device for steer-by-wire according to the present embodiments. FIG. 2 is a perspective view illustrating an assembled state of FIG. 1. FIG. 3 is a perspective view illustrating a portion of FIG. 1. FIG. 4 is a perspective view illustrating an assembled state of FIG. 3. FIGS. 5 and 6 are cross-sectional views of FIG. 2.

According to the present embodiments, a steering device 100 for steer-by-wire includes a first gear 102 engaged with a gear part 101a provided on an outer circumferential surface of a steering shaft 101, a second gear 103 having an inner circumferential surface engaged with the first gear 102, a disk 105 provided coaxially with the steering shaft 101 and rotated in conjunction with the first gear 102, and a rotation limiter 106 including a fixed frame 120 provided with a pair of supporting parts 121 spaced apart from each other in a width direction thereof, a driving frame 130 facing a first side of the disk 105 and provided to be axially slidable between the supporting parts 121, and an actuator 150 sliding the driving frame 130.

The steering shaft 101 is connected to a steering wheel and is rotated by the driver's manipulation of the steering wheel. The steering shaft 101 is provided with, e.g., a torque sensor and a rotation angle sensor, so that the driver's steering wheel manipulation is converted into an electrical signal to thereby rotate the wheels.

Although not illustrated in the drawings, the steering shaft 101 is provided with a reaction force motor and a stopper. The reaction force motor is controlled by an electronic control unit to apply torque to the steering shaft 101 in the direction opposite to the rotation direction of the steering shaft 101, and the stopper restricts rotation of the steering wheel and the steering shaft 101 when the rotation of the steering wheel reaches the maximum.

For example, the stopper may include a pair of plates fixed to the vehicle body and axially spaced apart from each other and a nut provided between the pair of plates and axially slid by the rotation of the steering shaft so that the nut is supported on the plates to limit the rotation. Thus, the rotation of the steering shaft 101 may be restricted only when the rotation of the steering wheel reaches the maximum. Therefore, in a case where the wheel cannot be rotated even when the steering wheel has not been rotated to the maximum, e.g., when the wheel is stuck to a curb, it is not possible to restrict the rotation of the steering wheel. According to the present embodiments, the steering device 100 for steer-by-wire includes the rotation limiter 106 and is thus able to restrict rotation of the steering shaft 101 in any situation.

Referring to FIGS. 1 and 2, the gear part 101a is formed on the outer circumferential surface of the steering shaft 101. The first gear 102 is engaged with the gear part 101a and is supported on the steering shaft 101. The second gear 103 having a gear formed on the inner circumferential surface thereof is engaged with the first gear 102.

There may be circumferentially provided a plurality of first gears 102 spaced apart from each other. The drawings illustrate an embodiment in which three first gears 102 are provided.

The first gear 102 is engaged with the inner circumferential surface of the second gear 103. In other words, the first gear 102 is provided between the outer circumferential surface of the steering shaft 101 and the inner circumferential surface of the second gear 103.

The second gear 103 is fixed to the vehicle body. Therefore, when the steering shaft 101 rotates, the second gear 103 is not rotated, but the first gear 102 is rotated around the central axis of the first gear 102 and the central axis of the steering shaft 101.

Although the drawings illustrate an embodiment in which the second gear 103 is formed in a ring shape for convenience, the present embodiments are not necessarily limited thereto, and the second gear 103 may be formed integrally with the housing, with a gear formed on the inner circumferential surface of the housing.

The disk 105 is provided coaxially with the steering shaft 101 and is rotated in conjunction with the first gear 102. In other words, the disk 105 is rotated in conjunction with the first gear 102 rotated around the central axis of the steering shaft 101.

The disk 105 has a first hole 111 into which the steering shaft 101 is inserted. The inner diameter of the disk 105 may be larger than the outer diameter of the steering shaft 101.

In other words, since the disk 105 is rotated in conjunction with the first gear 102, the speed at which the disk 105 is rotated is different from the speed at which the steering shaft 101 rotates due to the gear ratio. Thus, it is needed to form the inner diameter of the disk 105 to be larger than the outer diameter of the steering shaft 101 to prevent friction between the outer circumferential surface of the steering shaft 101 and the inner circumferential surface of the disk 105 when the steering shaft 101 rotates.

Although not illustrated in the drawings, the disk 105 may be coupled to the steering shaft 101 via a bearing.

Further, the disk 105 may be provided with a connecting shaft 104 to rotate in conjunction with the first gear 102. In other words, the first gear 102 may be provided with a connecting shaft 104 protruding axially, and a second hole 112 into which an end of the connecting shaft 104 is inserted may be formed in the disk 105.

As illustrated in the drawings, there may be formed a plurality of second holes 112 around the first hole 111, which are circumferentially spaced apart from each other.

The connecting shaft 104 may be manufactured as a separate product from the first gear 102 and be coupled to the first gear 102 by, e.g., press-fitting, as illustrated in the drawings. Alternatively, the connecting shaft 104 may be manufactured integrally with the first gear 102.

The disk 105 and the connecting shaft 104 may be coupled via a bearing 113. As illustrated in the drawings, the bearing 113 is fitted into the second hole 112, and the connecting shaft 104 may be coupled to the inner ring of the bearing 113.

In other words, since the first gear 102 and the connecting shaft 104 rotate not only about the central axis of the steering shaft 101 but also about the central axis of the first gear 102, the bearing 113 may be needed to prevent friction between the end of the connecting shaft 104 and the disk 105.

Although not illustrated in the drawings, the connecting shaft 104 may be integrally formed with the disk 105, and the opposite end thereof may be coupled to the first gear 102 via a bearing.

As described above, the disk 105 rotates together with the steering shaft 101 when the driver manipulates the steering wheel. When such an occasion occurs where a wheel is stuck to a curb, the rotation limiter 106 may produce friction against the disk 105 to thereby restrict rotation of the steering wheel in a certain circumstance.

Further, as the disk 105 is coupled to the steering shaft 101 by the first gear 102, the second gear 103, and the connecting shaft 104, wear or damage to the gear teeth may be prevented and stability may be enhanced, In other words, integration of the disk 105 with the steering shaft 101 is hard to implement and renders it difficult to assemble with other components. Thus, the disk 105 needs to be manufactured as a separate product from the steering shaft 101. Although the disk 105 manufactured as a separate product is coupled to the steering shaft 101 via, e.g., gears or spline, the rotation limiter 106 may be able to restrict rotation of the steering wheel but, in such a case, the torque applied to the gear or spline may be excessively large, causing the gear teeth to be easily worn or damaged.

Accordingly, as the disk 105 is coupled to the steering shaft 101 via, e.g., the first gear 102, the friction torque applied by the rotation limiter 106 to the disk 105 may be distributed, so that enhanced stability may be achieved.

Referring to FIGS. 3 to 6, the rotation limiter 106 includes a fixed frame 120, a driving frame 130, and an actuator 150. The fixed frame 120 has a pair of supporting parts 121 spaced apart from each other in the width direction. The driving frame 130 faces a first side of the disk 105 and is coupled to be axially slidable between the supporting parts 121. The driving frame 130 is axially slid by the actuator 150 to be supported on or spaced apart from the disk 105.

The fixed frame 120 is fixed to the vehicle body. Although not illustrated in the drawings, the fixed frame 120 may be coupled to the vehicle body by, e.g., a bracket.

The actuator 150 is controlled by an electronic control unit provided in the vehicle. In a circumstance where rotation is no longer possible, e.g., as a wheel is stuck to a curb, the electronic control unit controls the actuator 150 to allow the driving frame 130 to be supported on the disk 105 and produces friction to restrict rotation of the steering wheel.

As illustrated in the drawings, the driving frame 130 may include a friction pad 120a supported on the disk 105. As described below, a protrusion 123 provided in the fixed frame 120 may also have a friction pad 130a.

The fixed frame 120 may be provided with a protrusion 123 facing a second side of the disk 105. As the protrusion 123 is provided, the disk 105 is shaped to be partially inserted between the fixed frame 120 and the driving frame 130.

The protrusion 123 may be provided to be supported on the disk 105, and as described above, the friction pad 130a may be supported on the second side of the disk 105.

In other words, unlike the driving frame 130, which is axially slid by the actuator 150, the fixed frame 120 is fixed to the vehicle body and supported on the second side of the disk 105, so that it is possible to produce friction against the disc 105 regardless of whether the actuator 150 operates and thus allow the driver to have the sensation of steering upon manipulating the steering wheel.

Further, when the driving frame 130 is supported on the first side of the disk 105 by the actuator 150, the second side of the disk 105 is supported by the protrusion 123. As such, since the two opposite sides of the disk 105 are supported, it is possible to enhance structural stability and increase frictional force.

Subsequently, the supporting parts 121 have slide slits 122 which are axially elongated, and the driving frame 130 have slide protrusions 131 which are formed on two opposite sides thereof in the width direction and are inserted into the slide slits 122. The sliding of the driving frame 130 is guided by the slide slits 122 and the slide protrusions 131.

The slide slits 122 may be open axially, so that the slide protrusions 131 may be inserted into the slide slits 122, and the driving frame 130 may be coupled to the fixed frame 120. The drawings illustrate an embodiment in which the slide slits 122 are open in the width direction also, the present embodiments are not necessarily limited thereto.

Further, the rotation limiter 106 may include a cover member 140 axially coupled to the supporting parts 121. In other words, after the driving frame 130 is coupled to the fixed frame 120, the cover member 140 is coupled to the supporting parts 121, preventing the driving frame 130 from escaping off the fixed frame 120.

The cover member 140 may have insertion protrusions 141 inserted into the slide slits 122 to allow the cover member 140 to be coupled to the supporting parts 121. Alternatively, the cover member 140 may be coupled to the supporting parts 121, e.g., by screwing.

The driving frame 130 may be provided with a through hole 132 penetrating axially, and the actuator 150 may be provided with a rotation shaft 151 inserted into the through hole 132. The driving frame 130 is axially slid by the rotation of the rotation shaft 151. A motor may be used as the actuator 150.

In other words, a screw portion is formed on the outer circumferential surface of the rotation shaft 151 and in the through hole 132 so that the driving frame 130 and the rotation shaft may be screwed with each other. The rotation shaft 151 is rotated by the operation of the actuator 150, sliding the driving frame 130 by screwing.

Since the slide protrusions 131 provided on two opposite sides, in the width direction, of the driving frame 130 are inserted into the slide slits 122 and are circumferentially supported by the supporting parts 121, the driving frame 130 is not rotated but merely slid axially despite rotation of the rotation shaft 151.

Since the driving frame 130 is provided between the fixed frame 120 and the cover member 140, an insertion hole 142 and an insertion recess 311 need to be provided so that the rotation shaft 151 is coupled to the driving frame 130.

In other words, either the fixed frame 120 or the cover member 140 may have an insertion hole 142 formed axially therethrough to allow the rotation shaft 151 to be inserted therethrough, and the other may have an insertion recess 311 fitted over an end of the rotation shaft 151.

The drawings illustrate an embodiment in which the insertion hole 142 is provided in the cover member 140 and the insertion recess 311 is provided in the fixed frame 120, and vice versa.

In order for the rotation shaft 151 to rotate smoothly, bearings 143 and 312 are provided in the insertion hole 142 and the insertion recess 311 so that two opposite ends of the rotation shaft 151 may be coupled to the fixed frame 120 and the cover member 140 via the bearings 143 and 312.

Assembly of the rotation limiter 106 is described. The slide protrusions 131 are inserted into the slide slits 122 so that the fixed frame 120 and the driving frame 130 are coupled together. The cover member 140 is coupled to the supporting parts 121 while closing the slide slits 122. The rotation shaft 151 is inserted into the insertion hole 142, the through hole 132, and the insertion recess 311, so that the actuator 150 may be coupled.

By the so-shaped steering device for steer-by-wire, the disk may be coupled to the steering shaft via the first gear, the second gears, and the connecting shaft, so that the torque may be distributed when the rotation limiter applies friction against the disk. Thus, it is possible to prevent wear or damage to the gear teeth and hence enhance stability.

Further, as the protrusion of the fixed frame is supported on the second side of the disk, friction torque is applied upon rotation of the steering shaft, providing the sensation of weight to the driver's manipulation of steering wheel and thus enhancing the steering feel.

Further, it is possible to enhance the driver's steering feel and steering stability by restricting the rotation of the steering shaft in an arbitrary situation in which the wheel may no longer be rotated, such as when a wheel is stuck to a curb.

Although it is described above that all of the components are combined into one or are operated in combination, embodiments of the disclosure are not limited thereto. One or more of the components may be selectively combined and operated as long as it falls within the scope of the objects of the embodiments.

When an element "comprises," "includes," or "has" another element, the element may further include, but rather than excluding, the other element, and the terms "comprise," "include," and "have" should be appreciated as not excluding the possibility of presence or adding one or more features, numbers, steps, operations, elements, parts, or combinations thereof. All the scientific and technical terms as used herein may be the same in meaning as those commonly appreciated by a skilled artisan in the art unless defined otherwise. It will be further understood that terms, such as those defined dictionaries, should be interpreted as having a meaning that is consistent with their meaning in the context of the relevant art and will not be interpreted in an idealized or overly formal sense unless expressly so defined herein.

The above description has been presented to enable any person skilled in the art to make and use the technical idea of the present disclosure, and has been provided in the context of a particular application and its requirements. Various modifications, additions and substitutions to the described embodiments will be readily apparent to those skilled in the art, and the general principles defined herein may be applied to other embodiments and applications without departing from the spirit and scope of the present disclosure. The above description and the accompanying drawings provide an example of the technical idea of the present disclosure for illustrative purposes only. That is, the disclosed embodiments are intended to illustrate the scope of the technical idea of the present disclosure. Thus, the scope of the present disclosure is not limited to the embodiments shown, but is to be accorded the widest scope consistent with the claims. The scope of protection of the present disclosure should be construed based on the following claims, and all technical ideas within the scope of equivalents thereof should be construed as being included within the scope of the present disclosure.

CROSS-REFERENCE TO RELATED APPLICATION

This application claims priority, under 35 U.S.C. 119(a), to Korean Patent Application No. 10-2019-0029548, filed in the Korean Intellectual Property Office on Mar. 14, 2019, the disclosure of which is incorporated by reference herein in its entirety.

The invention claimed is:

1. A steering device for steer-by-wire, comprising:
a first gear engaged with a gear part provided on an outer circumferential surface of a steering shaft;
a second gear having an inner circumferential surface engaged with the first gear;
a disk provided coaxially with the steering shaft and rotated in conjunction with the first gear; and
a rotation limiter including a fixed frame provided with a pair of supporting parts spaced apart from each other in a width direction thereof, a driving frame facing a first side of the disk and provided to be axially slidable between the supporting parts, and an actuator sliding the driving frame.

2. The steering device of claim 1, wherein a first hole into which the steering shaft is inserted is formed in the disk.

3. The steering device of claim 2, wherein an inner diameter of the disk is larger than an outer diameter of the steering shaft.

4. The steering device of claim 2, wherein the first gear is provided with a connecting shaft protruding axially, and wherein the disk has a second hole into which an end of the connecting shaft is inserted.

5. The steering device of claim 4, wherein the disk and the connecting shaft are coupled to each other via a bearing.

6. The steering device of claim 1, wherein the fixed frame is provided with a protrusion facing a second side of the disk.

7. The steering device of claim 6, wherein the protrusion is supported on the disk.

8. The steering device of claim 1, wherein the supporting parts have slide slits axially elongated, and the driving frame has slide protrusions on two opposite sides, in a width direction, thereof, the slide protrusions inserted into the slide slits.

9. The steering device of claim 8, wherein the slide slits are axially open.

10. The steering device of claim 9, wherein the rotation limiter includes a cover member axially coupled to the supporting parts.

11. The steering device of claim 10, wherein the cover member is provided with insertion protrusions inserted into the slide slits.

12. The steering device of claim 10, wherein the driving frame is provided with a through hole axially penetrated, and wherein the actuator is provided with a rotation shaft inserted into the through hole.

13. The steering device of claim 12, wherein the driving frame and the rotation shaft are screwed to each other.

14. The steering device of claim 12, wherein an insertion hole is axially formed through either the fixed frame or the cover member to allow the rotation shaft to be inserted therethrough.

15. The steering device of claim 14, wherein an insertion recess is formed in the other of the fixed frame or the cover member to allow an end of the rotation shaft to be inserted thereinto.

16. The steering device of claim 15, wherein two opposite ends of the rotation shaft are coupled to the fixed frame and the cover member via bearings.

* * * * *